United States Patent
Parker

(10) Patent No.: US 10,908,904 B2
(45) Date of Patent: Feb. 2, 2021

(54) CHECK INSTRUCTION FOR VERIFYING CORRECT CODE EXECUTION CONTEXT

(71) Applicant: ARM Limited, Cambridge (GB)

(72) Inventor: Jason Parker, Cambridge (GB)

(73) Assignee: ARM Limited, Cambridge (GB)

( * ) Notice: Subject to any disclaimer, the term of this patent is extended or adjusted under 35 U.S.C. 154(b) by 181 days.

(21) Appl. No.: 15/571,952

(22) PCT Filed: Apr. 12, 2016

(86) PCT No.: PCT/GB2016/051023
§ 371 (c)(1),
(2) Date: Nov. 6, 2017

(87) PCT Pub. No.: WO2016/177992
PCT Pub. Date: Nov. 10, 2016

(65) Prior Publication Data
US 2018/0143831 A1    May 24, 2018

(30) Foreign Application Priority Data

May 7, 2015 (GB) .................................. 1507795.1

(51) Int. Cl.
*G06F 9/30* (2018.01)
*G06F 11/00* (2006.01)
(Continued)

(52) U.S. Cl.
CPC ...... *G06F 9/30079* (2013.01); *G06F 9/30021* (2013.01); *G06F 9/30076* (2013.01);
(Continued)

(58) Field of Classification Search
None
See application file for complete search history.

(56) References Cited

U.S. PATENT DOCUMENTS 5,537,560 A    7/1996    Boggs et al.
6,513,110 B1   1/2003    Keppel et al.
(Continued)

FOREIGN PATENT DOCUMENTS

EP    1 124 184    8/2001
GB    2482701      2/2012

OTHER PUBLICATIONS

International Search Report and Written Opinion of the International Searching Authority dated Jul. 4, 2016 in PCT/GB2016/051023, 15 pages.
(Continued)

*Primary Examiner* — John M Lindlof
(74) *Attorney, Agent, or Firm* — Nixon & Vanderhye, P.C.

(57) ABSTRACT

A data processing apparatus and method of data processing are provided which make use of a processor state check instruction to determine if the data processing apparatus is currently operating in a processor state, defined by at least one runtime processor state configuration value, which matches a processor state check value defined by the processor state check instruction. Dependent on the required runtime processor state configuration value(s) matching the processor state check value, the processor state check instruction is treated as an ineffective instruction. When the at least one runtime processor state configuration value does not match the processor state check value an exception is generated. Improved security of the data processing apparatus is thus provided.

13 Claims, 8 Drawing Sheets

(51) Int. Cl.
*G06F 9/38* (2018.01)
*G06F 21/52* (2013.01)
*G06F 21/71* (2013.01)

(52) U.S. Cl.
CPC ...... *G06F 9/30094* (2013.01); *G06F 9/30101* (2013.01); *G06F 9/30189* (2013.01); *G06F 9/3861* (2013.01); *G06F 11/004* (2013.01); *G06F 21/52* (2013.01); *G06F 21/71* (2013.01)

(56) References Cited

U.S. PATENT DOCUMENTS

| | | | |
|---|---|---|---|
| 6,516,395 | B1 | 2/2003 | Christie |
| 2004/0015627 | A1* | 1/2004 | Desoli ................ G06F 9/45504 710/260 |
| 2008/0034350 | A1* | 2/2008 | Conti ..................... G06F 21/54 717/124 |
| 2015/0339177 | A1* | 11/2015 | Heisswolf .......... G06F 11/0721 714/35 |
| 2016/0179667 | A1* | 6/2016 | Kumar .................. G06F 11/073 711/135 |

OTHER PUBLICATIONS

Combined Search and Examination Report dated Nov. 9, 2015 in GB 1507795.1, 7 pages.

\* cited by examiner

MODE_ASSERT <EL3, EL2, EL1, EL0>, <S, NS>,
<DEBUG, nDEBUG>

MODE_ASSERT <PL2, PL1, PL0>, <S, NS>,
<DEBUG, nDEBUG>

FIG. 3A

```
IF ((CURRENT_EXCEPTION_LEVEL() & EL. FLAGS) AND
   (CURRENT_SECURITY_STATE() & S. FLAGS) AND
   (CURRENT_DEBUG_STATE() & DEBUG. FLAG))
   {NOP}
ELSE
   {ILLEGAL_INSTRUCTION_EXCEPTION}
```

FIG. 3B

MODE_ASSERT <EL_INDEX>, <S_INDEX>

MODE_ASSERT_EXCEPTION_LEVEL <EL0, EL1, E2, EL3>
MODE_ASSERT_SECURE <S, NS>

CHECK INSTRUCTION FOR VERIFYING CORRECT CODE EXECUTION CONTEXT

This application is the U.S. national phase of International Application No. PCT/GB2016/051023 filed 12 Apr. 2016, which designated the U.S. and claims priority to GB Patent Application No. 1507795.1 filed 7 May 2015, the entire contents of each of which are hereby incorporated by reference.

TECHNICAL FIELD

The present disclosure relates to a data processing apparatus. More particularly it relates to checking that the context in which program code is executed on the data processing apparatus is correct.

BACKGROUND

A data processing apparatus may operate in more than one state or mode, which has various effects on the manner in which the data processing apparatus carries out its data processing apparatus, but in particular may define which data stored in the data processing apparatus is currently allowed to be accessed. For example, a memory management unit (MMU) may be interposed between a processor of the data processing apparatus and the memory in order to police access to the memory. The configuration of the MMU can be such that when the processor is operating in a less privileged mode or a non-secure state, it is not allowed to access regions of the memory which have been defined only to be accessible to the processor when operating in a privileged or secure state. This may for example be done by means of the MMU accessing page tables stored in the memory, entries of which define which regions of memory are accessible to which modes or states. The provision of such techniques have previously been seen as sufficient to ensure that the desired security of data items stored in the memory is respected during operation of the data processing apparatus.

SUMMARY

In one example embodiment there is a data processing apparatus comprising: data processing circuitry to perform data processing operations in response to a sequence of data processing instructions, wherein the data processing circuitry is responsive to at least one runtime processor state configuration value stored in the data processing apparatus to perform the data processing operations in a processor state defined by the at least one runtime processor state configuration value, wherein the data processing circuitry is responsive to a processor state check instruction to establish a no-operation condition dependent on the at least one runtime processor state configuration value matching a processor state check value defined by the processor state check instruction, and to treat the processor state check instruction as an ineffective instruction when the no-operation condition is established, and to generate an illegal instruction exception when the no-operation condition is not established, wherein in response to said illegal instruction exception further execution of said sequence of data processing instructions is prevented.

In another example embodiment there is a computer program product in which a computer program is stored in a non-transient fashion, which when executed on a computing device causes the computing device to operate as the data processing apparatus of the above example embodiment.

In another example embodiment there is a computer program product in which a computer program is stored in a non-transient fashion comprising at least one processor state check instruction as defined in accordance with the above example embodiment.

In another example embodiment there is a dynamic code generator capable of generating data processing instructions for a data processing apparatus according to above example embodiment, wherein the data processing instructions comprise the processor state check instruction.

In another example embodiment there is a virtual machine provided by a computer program executing upon a data processing apparatus, said virtual machine providing an instruction execution environment corresponding to the apparatus of the above example embodiment.

In another example embodiment there is a data processing apparatus comprising: means for performing data processing operations in response to a sequence of data processing instructions, wherein the data processing operations are performed in a processor state defined by at least one runtime processor state configuration value stored in the data processing apparatus; means for establishing a no-operation condition dependent on the runtime processor state configuration value matching a processor state check value defined by a processor state check instruction; means for treating the processor state check instruction as an ineffective instruction when the no-operation condition is established; and means for generating an illegal instruction exception when the no-operation condition is not established, wherein in response to said illegal instruction exception further execution of said sequence of data processing instructions is prevented.

In another example embodiment there is a method of data processing comprising: performing data processing operations in response to a sequence of data processing instructions, wherein the data processing operations are performed in a processor state defined by at least one runtime processor state configuration value; in response to a processor state check instruction, establishing a no-operation condition dependent on the at least one runtime processor state configuration value matching a processor state check value defined by the processor state check instruction; treating the processor state check instruction as an ineffective instruction when the no-operation condition is established; and generating an illegal instruction exception when the no-operation condition is not established, wherein in response to said illegal instruction exception further execution of said sequence of data processing instructions is prevented.

In another example embodiment there is a computer program product in which a computer program is stored in a non-transient fashion, which when executed on a computing device causes the computing device to carry out the method of the above example embodiment.

BRIEF DESCRIPTION OF THE DRAWINGS

The present techniques will be described further, by way of example only, with reference to embodiments thereof as illustrated in the accompanying drawings, in which:

FIG. 3A shows two example processor state check instructions in one embodiment;

FIG. 3B shows a pseudo-code representation of the manner in which the data processing circuitry responds to the first processor state check instruction of FIG. 3A in one embodiment;

DESCRIPTION OF EMBODIMENTS

Figure 1:
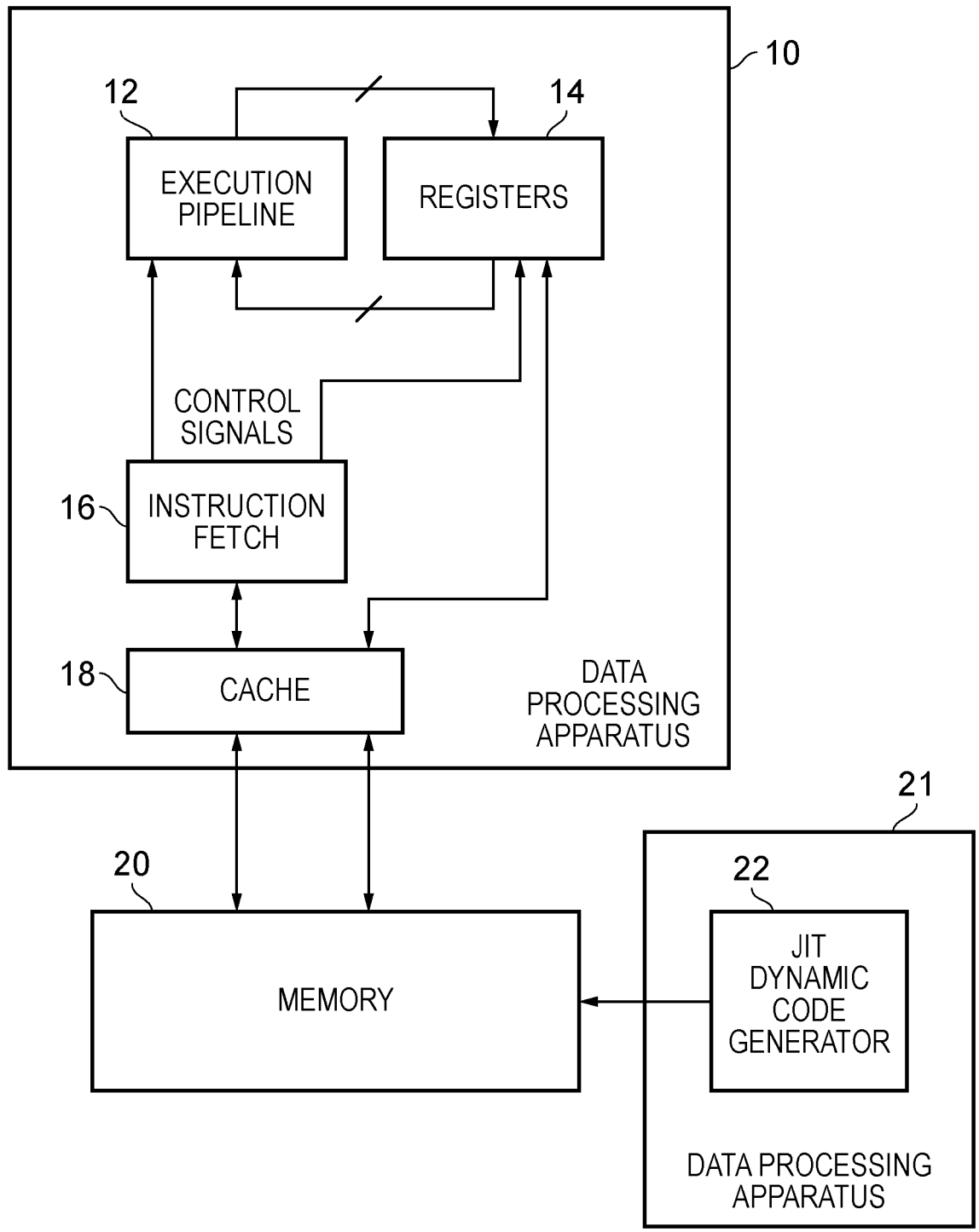
FIG. 1 schematically illustrates a data processing apparatus in one embodiment.

At least some embodiments provide a data processing apparatus comprising: data processing circuitry to perform data processing operations in response to a sequence of data processing instructions, wherein the data processing circuitry is responsive to at least one runtime processor state configuration value stored in the data processing apparatus to perform the data processing operations in a processor state defined by the at least one runtime processor state configuration value, wherein the data processing circuitry is responsive to a processor state check instruction to establish a no-operation condition dependent on the at least one runtime processor state configuration value matching a processor state check value defined by the processor state check instruction, and to treat the processor state check instruction as an ineffective instruction when the no-operation condition is established, and to generate an illegal instruction exception when the no-operation condition is not established, wherein in response to said illegal instruction exception further execution of said sequence of data processing instructions is prevented.

The present techniques recognise that although a data processing apparatus may be provided, the configuration of which is intended to ensure that data processing circuitry of the data processing apparatus cannot access particular regions of memory unless it is operating in a defined state which is allowed to do so, situations may nevertheless arise (whether due to inadvertent bugs in program code or an intended malicious attack) in which reliable security with respect to the data processing operations is not entirely guaranteed. For example, the present techniques recognise that it may be possible for bugs or attacks to lead to the "out of context" use of sensitive code, such as private algorithms that should not be exposed (i.e. their security should be maintained). Alternatively, situations may arise (whether due to bugs or an attack) in which the inappropriate use of code in a sensitive context may occur, such as pure user code from a kernel context. The present techniques recognise that such situations could lead to security vulnerabilities and exploits, despite correct configuration of, for example, memory protection attributes handled by a memory management unit.

To address this problem, the present techniques provide a processor state check instruction in the defined set of data processing instructions which the data processing apparatus is able to interpret and execute. This processor state check instruction causes data processing circuitry (e.g. a processor core, or more particularly an execution pipeline) to compare a processor state check value defined by the processor state check instruction with the current (runtime) processor state, in particular by comparing to a runtime processor state configuration value stored in the data processing apparatus. The programmer of the data processing apparatus can therefore appropriately set a processor state check value defined by the processor state check instruction for the desired context in which the instruction should be executed. In other words, this processor state check instruction can be inserted by the programmer of the data processing apparatus into one or more positions in a particular sequence of data processing instructions, such that when executing that sequence of data processing instructions the data processing circuitry will perform a check (in response to the processor state check instruction) to ensure that the data processing apparatus is currently operating in a state which is appropriate (i.e. allowed) to execute that sequence of data processing instructions. If this check is passed then the data processing circuitry treats the processor state check instruction as a no-operation (NOP) instruction and execution continues without any side effects. However, if the check fails then the data processing circuit responds by generating an exception, which can be appropriately defined to ensure that further execution of this sequence of data processing instructions is not possible. Accordingly, the provision of this processor state check instruction ensures that the system programmer has a further mechanism (to the known technique of correctly configuring memory protection attributes) to ensure that it can be checked (as often as the programmer cares to insert this processor state check instruction into code) that the current context (mode or state) is appropriate for the data processing operations being carried out.

The nature of the processor state which is defined by the runtime processor state configuration value and which is checked by the use of the processor state check instruction may take a variety of forms. In some embodiments, the processor state defined by the at least one runtime processor state configuration value comprises operation at an exception level of multiple exception levels at which the data processing apparatus is capable of performing the data processing operations. These multiple exception levels (which may in some contexts be referred to instead as "privilege levels" or "rings") may for example comprise four exception levels each with an increasing level of privilege and allowed accessibility to data in the data processing apparatus with respect to a lower exception level. In some embodiments, the processor state defined by the at least one runtime processor state configuration value comprises a security state of multiple security states in which the data processing apparatus is capable of performing the data processing operations. For example, the data processing apparatus may be configured to operate in either a "secure" mode or a "non-secure" mode, wherein certain data stored in the data processing apparatus or particular sequences of program code held in the apparatus may only be accessed or executed respectively when the data processing apparatus is currently in its "secure" mode.

In some embodiments the processor state defined by the at least one runtime processor state configuration value comprises a debug state of multiple debug states in which the data processing apparatus is capable of performing the data processing operations. The ability to operate in a debug state may be provided for the data processing apparatus in order to allow the programmer greater visibility of the internal operation of the data processing apparatus as it carries out its data processing operations in response to a sequence of data processing instructions. However it is recognised by the present techniques that this additional visibility, which is provided to the programmer by operation in the debug state, and which may for example include the ability to cause the data processing apparatus to "single step" through data processing instructions, may only be appropriate to be provided in certain contexts, and for example, not in contexts where greater protection of data items or sequences of program instructions is to be provided.

In some embodiments the processor state defined by the at least one runtime processor state configuration value comprises a privilege mode of multiple privilege modes in which the data processing apparatus is capable of performing the data processing operations. Similarly, the data processing apparatus may be arranged to be able to operate in more than one privilege mode, wherein access to certain data items, or the execution of particular sequences of program code, should only be carried out when the data processing apparatus is in a "privileged" mode and not when operating in "non-privileged" mode and the present techniques support the enforcement of such constraints.

The above-mentioned examples of runtime processor state configuration values may individually define a processor mode or state, but in some embodiments the data processing circuitry is responsive to multiple runtime processor state configuration values stored in the data processing apparatus to perform the data processing operations in respective processor states defined by the multiple runtime processor state configuration values, and wherein the data processing circuitry is responsive to the processor state check instruction to require each of the multiple runtime processor state configuration values to match a corresponding processor state check value of multiple processor state check values defined by the processor state check instruction to establish the no-operation condition. In such embodiments the processor state check instruction can define values that each of the multiple runtime processor state configuration values must match in order for the no-operation condition to be established. In other words, one processor state check instruction may define required values for each of several different processor state configuration values.

Alternatively, multiple types of processor state check instruction may be provided, for example one type for each type of runtime processor state configuration value, and in such embodiments the data processing circuitry is responsive to multiple runtime processor state configuration values stored in the data processing apparatus to perform the data processing operations in respective processor states defined by the multiple runtime processor state configuration values, and wherein the data processing circuitry is responsive to each of multiple types of processor state check instruction to require a corresponding runtime processor state configuration value of the multiple runtime processor state configuration values to match a corresponding processor state check value defined by that processor state check instruction to establish the no-operation condition.

In some embodiments the processor state check instruction defines a particular value of the processor state check value for a given type of processor state which must be matched in order for the no-operation condition to be established. However, in some embodiments the processor state check instruction defines multiple processor state check values for one type of processor state, and wherein the data processing circuitry is responsive to the processor state check instruction to require at least one of the multiple processor state check values defined for one type of processor state to match the corresponding runtime processor state configuration value stored in the data processing apparatus for the one type of processor state to establish the no-operation condition. In other words, the processor state check instruction can define more than one acceptable value for the runtime processor state configuration value in order to establish the no-operation condition. For example, in the above examples where several operational levels are defined for the operation of the data processing apparatus (e.g. exception levels or privilege levels), the processor state check instruction can define that more than one of these levels (e.g. the uppermost two) are acceptable states in which the data processing apparatus may be operating and thus for the no-operation condition to be allowed to be established.

The runtime processor state configuration value may be stored in a variety of locations or formats in the data processing apparatus, but in some embodiments the data processing apparatus comprises a state register to store the runtime processor state configuration value.

The processor state check instruction may define the corresponding processor state check value in a variety of ways. In some embodiments the processor state check value is comprised in the processor state check instruction. In other words, the corresponding processor state check value is then defined as a flag or immediate value given in the processor state instruction itself.

In some embodiments, the data processing apparatus further comprises check value storage to store the corresponding processor state check value and to which the processor state check instruction causes reference to be made by the data processing circuitry. This check value storage may for example take the form of a lookup table in the data processing apparatus for which the processor state check instruction provides an index, such that corresponding required processor state check values may be retrieved to be compared against.

The manner in which the processor state check instruction is treated as an ineffective instruction when the no-operation condition is established can take a number of forms. In some embodiments it comprises allowing the processor state check instruction to proceed through an execution pipeline of the data processing circuitry without affecting an outcome of the data processing operations. Thus to the external observer the presence of the processor state check instruction in the sequence of instructions executed will have had no perceptible effect in terms of data processing outcome, although of course resources will have been consumed by virtue of the passage of the processor state check instruction through the execution pipeline. In some embodiments treating the processor state check instruction as an ineffective instruction comprises treating the processor state check instruction as a no-operation instruction. As such the processor state check instruction may be discarded at the first opportunity.

At least some embodiments provide a computer program product in which a computer program is stored in a non-transient fashion, which when executed on a computing device causes the computing device to operate as the data processing apparatus of any of the above-discussed embodiments.

At least some embodiments provide a computer program product in which a computer program is stored in a non-transient fashion comprising at least one processor state check instruction as discussed above with reference to the above-discussed embodiments.

At least some embodiments provide a dynamic code generator capable of generating data processing instructions for a data processing apparatus of any of the above-described embodiments, wherein the data processing instructions comprise a processor state check instruction in any of the forms thereof mentioned above. For example, this dynamic code generator may take the form of a just-in-time (JIT) engine.

At least some embodiments provide a virtual machine provided by a computer program executing upon a data processing apparatus, the virtual machine providing an instruction execution environment corresponding to the apparatus of any one of the above-described embodiments.

At least some embodiments provide a data processing apparatus comprising: means for performing data processing operations in response to a sequence of data processing instructions, wherein the data processing operations are performed in a processor state defined by at least one runtime processor state configuration value stored in the data processing apparatus; means for establishing a no-operation condition dependent on the runtime processor state configuration value matching a processor state check value defined by a processor state check instruction; means for treating the processor state check instruction as an ineffective instruction when the no-operation condition is established; and means for generating an illegal instruction exception when the no-operation condition is not established, wherein in response to said illegal instruction exception further execution of said sequence of data processing instructions is prevented.

At least some embodiments provide a method of data processing comprising: performing data processing operations in response to a sequence of data processing instructions, wherein the data processing operations are performed in a processor state defined by at least one runtime processor state configuration value; in response to a processor state check instruction, establishing a no-operation condition dependent on the at least one runtime processor state configuration value matching a processor state check value defined by the processor state check instruction; treating the processor state check instruction as an ineffective instruction when the no-operation condition is established; and generating an illegal instruction exception when the no-operation condition is not established, wherein in response to said illegal instruction exception further execution of said sequence of data processing instructions is prevented.

At least some embodiments provide a computer program product in which a computer program is stored in a non-transient fashion, which when executed on a computing device causes the computing device to carry out the method of the above-mentioned embodiments.

Some particular embodiments are now described with reference to the figures.

FIG. 1 schematically illustrates a data processing apparatus in one embodiment. The data processing apparatus 10 comprises an execution pipeline 12 and associated registers 14. Data processing instructions to be executed by the execution pipeline 12 are fetched by the instruction fetch unit 16, which on the basis of each instruction to be issued to the execution pipeline 12 transmits various control signals to the execution pipeline 12 and the registers 14, so that the desired data processing takes place. The instruction fetch unit 16 retrieves the sequence of data processing instructions to be executed from memory 20, and the data processing apparatus 10 further comprises a local cache 18 in which copies of recently accessed instructions and data are temporarily stored. This general arrangement of a data processing apparatus is one with which one of ordinary skill in the art will be familiar, and further detailed description thereof is omitted here for brevity. However, according to the present techniques, the data processing apparatus 10 is configured to be responsive to a "processor state check instruction", which the programmer can use to ensure that the context in which program code is executed on the data processing apparatus is correct. This is described in more detail below. Note that FIG. 1 also schematically illustrates further data processing apparatus 21, which is running software comprising a just-in-time (JIT) dynamic code generator 22, which can generate and store a sequence of data processing instructions for execution by the data processing apparatus 10 in the memory 20, and these data processing instructions may include at least one of the processor state check instructions.

Figure 2A:
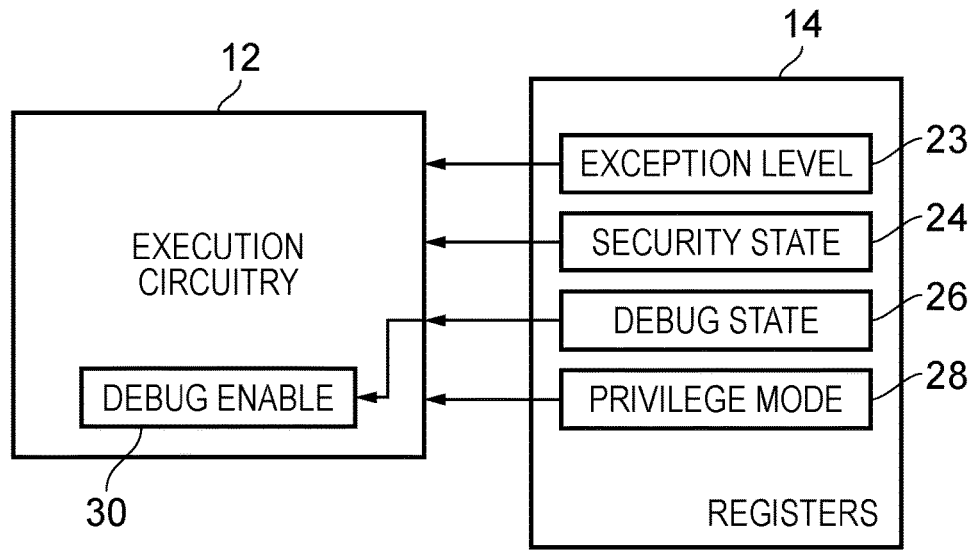
FIG. 2A schematically illustrates the configuration of execution circuitry and registers in a data processing apparatus in one embodiment.

The registers 14 of the data processing apparatus 10 may be used in a variety of ways by the execution pipeline 12 shown in FIG. 1 in order to support the data processing operations instructed by the data processing instructions. However, one particular aspect thereof which is of relevance to the present techniques is the use of specific registers to hold one or more values which define a runtime processor state for the processor core (i.e. execution pipeline or circuitry). This is schematically illustrated in FIG. 2A. In this figure, four of this type of state register are illustrated each holding a runtime processor state configuration value, namely registers for the exception level 23, security state 24, debug state 26 and privilege mode 28. It should be noted that all four of these registers are illustrated in FIG. 2A for the sake of providing a range of examples, but there is no need for all four such registers to be present in order to define the runtime processor state, and other embodiments may only have one or more of these registers. Indeed, it may for example be the case that there is no need to have both the exception level register 23 and the privilege mode register 28, since in some embodiments exception level and privilege level are essentially the same thing. For example in the context of the ARM architectures, 32-bit ARM is defined in terms of privilege levels, whilst 64-bit ARM is defined in terms of exception levels. FIG. 2A further shows a debug enable value 30 held within the execution circuitry 12 which is configured in dependence on the value set in the debug state register 26.

Figure 2B:
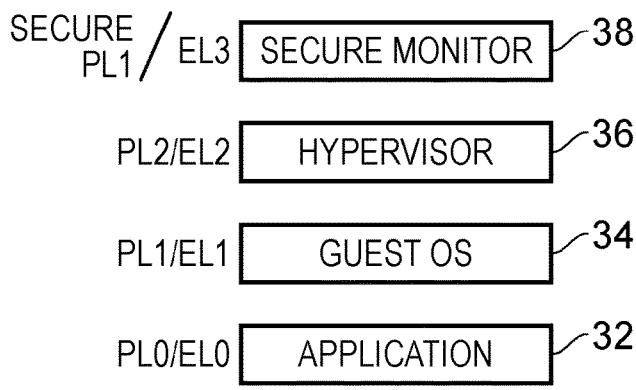
FIG. 2B schematically illustrates privilege levels and/or exception levels supported in a data processing apparatus of one embodiment.

FIG. 2B schematically illustrates one example usage of the exception levels/privilege modes, in the context of a virtual machine environment being provided by the execution circuitry 12. FIG. 2B shows guest operating system 34 and an application 32 which operate within this virtualised operating environment. Overall control of this guest operating system and the application it executes is maintained by the hypervisor 36, which further maintains overall control of the wider virtualised operating environment and dictates what a particular virtual machine (i.e. guest operating system and the applications it is running) can see and interact with in the system. FIG. 2B further schematically illustrates the fact that different components of the system shown operate at different "exception levels" (EL0-3) or "privilege levels" (PL0-2), which define the level of control and visibility of other components on the system that a given component has. Thus, a privilege hierarchy is supported, with the application 32 operating at a lowest level of that hierarchy, the guest operating system 34 operating the next level of that hierarchy, and the hypervisor 36 operating at a still higher level. Note also that in FIG. 2B a further still higher level of this privilege hierarchy is shown, namely the secure monitor 38, which operates at the highest level of privilege supported in the system ("Secure-PL1"/EL3) in order to maintain strict control over the sub-division of the system into a "secure world" and a "non-secure world" to provide a reliable security division between trusted applications/operating systems which may handle security sensitive data and other applications/operating systems to which such trust is not afforded.

Figure 2C:
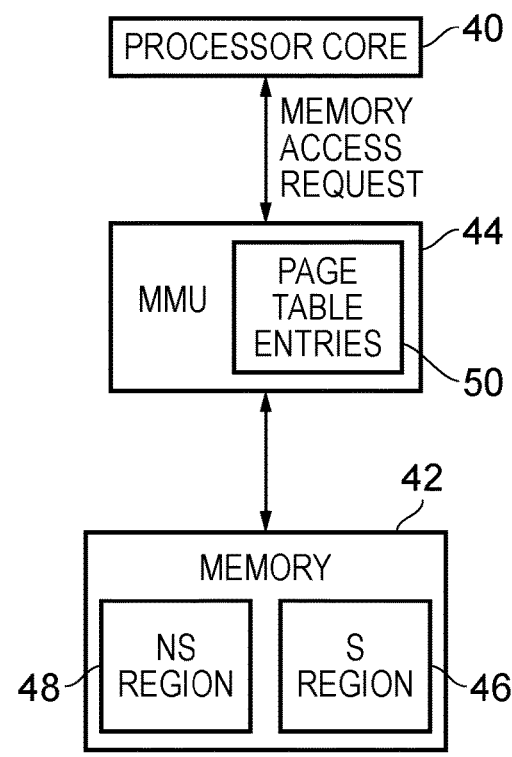
FIG. 2C schematically illustrates a memory management unit interposed between a processor core and memory in one embodiment.

With reference to the above mentioned "secure world" and "non-secure world", FIG. 2C schematically illustrates one way in which access to defined secure and non-secure regions of the memory is implemented in one embodiment. Here, a processor core 40 seeks access to content of a memory 42 by issuing a memory access request. This memory access request is received by a memory management unit (MMU) 44 which polices such memory access requests and ensures in particular that access to a secure region of memory 46 is only afforded to the processor core 40 when it is operating in an appropriate context, i.e. one in which the relevant component issuing the memory access request is defined to be "secure". Access to the non-secure region of memory 48 may for example be more freely provided, such that components operating in either the secure world or the non-secure world may access such data. The MMU 44 determines whether a given memory access request is allowed to proceed to the memory 42 in dependence on the attributes of a corresponding page table entry. The MMU 44 stores a number of page table entries 50 locally in order to expedite this process, but these page table entries 50 are originally retrieved, in a manner with which one of ordinary skill in the art will be familiar, from a full page table in memory as appropriate.

FIG. 3A shows two example processor state check instructions ("MODE_ASSERT") in one embodiment. It can be seen that the first example of the instruction defines fields which relate to the exception level, the security state, and the debug state. Each of these fields of the instruction can be set to have a value indicating the corresponding run processor state configuration value which is required for the MODE_ASSERT instruction to be treated as an ineffective instruction. In one embodiment of the data processing apparatus 10 of FIG. 1, the MODE_ASSERT instruction is allowed to progress through the execution pipeline 12, but the control signals from the instruction fetch unit (circuitry) 16 prevent this instruction from affecting the outcome of the data processing operations, for example by restricting the effect that the instruction can have on the content of the registers 14. In another embodiment of the data processing apparatus 10 of FIG. 1, the control signals from the instruction fetch unit 16 cause this instruction MODE_ASSERT instruction to be treated as a no-operation (NOP) instruction and hence to immediately be discarded. Note again (similarly to the comment made with respect to FIG. 2A) that there may be embodiments of the data processing apparatus which executes these instructions which only has one or other of the exception level and privilege mode runtime processor state configuration values, and correspondingly the second example MODE_ASSERT instruction of FIG. 3A defines fields which relate to the privilege level, the security state, and the debug state. The configuration of the data processing apparatus is such that, for either example instruction, if at least one value defined in the MODE_ASSERT instruction in each set of fields matches the corresponding value currently defining the runtime processor state configuration (e.g. as stored in a corresponding register 14 in the example of FIGS. 1 and 2A) then the MODE_ASSERT instruction is treated as ineffective (e.g. as a NOP instruction). Otherwise an illegal instruction exception is generated.

FIG. 3B shows example pseudo-code for implementing the response of the data processing apparatus to an example MODE_ASSERT instruction. Note that in the example of FIG. 3B there is no dependency on a "privilege mode" value, and only a dependency on an "exception level" value, since the data processing apparatus in this example is arranged to have exception levels, but not privilege levels. It can be seen that at least one of the flags set for each of the exception level, the security state and the debug state in the instruction must match the current (runtime) level or state of each for the no-operation response to follow. Otherwise an illegal instruction exception is generated. Referring back to FIG. 2B, note that some combinations of the values of the fields of the MODE_ASSERT instruction will always be invalid, due to the system level definition of the privilege hierarchy (in terms of exception/privilege levels and security), namely: PL2 and Secure; EL2 and Secure; and EL3 and Non-Secure.

Figures 4A, 4B, 4C:
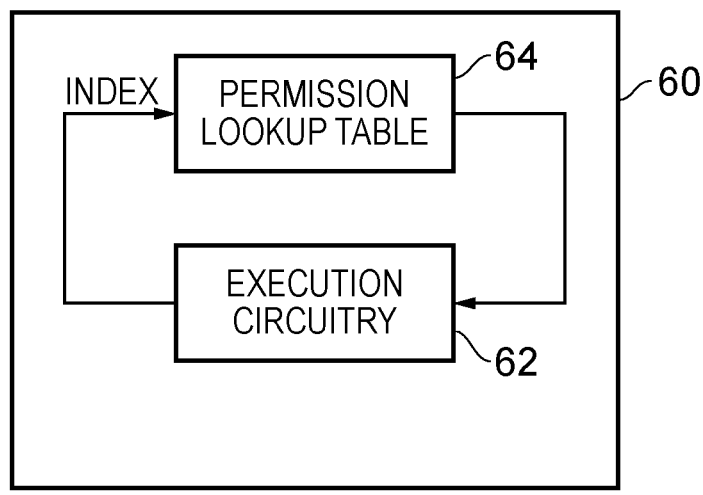
FIG. 4A shows a processor state check instruction in one embodiment.
FIG. 4B schematically illustrates execution circuitry referencing a permission look-up table when executing the processor state check instruction of FIG. 4A in one embodiment.
FIG. 4C shows two processor state specific check instructions in one embodiment.

Whilst the MODE_ASSERT instruction may comprise immediate values defining the run time processor state configuration value(s) which will allow the MODE_ASSERT instruction to be treated as a NOP instruction, the example MODE_ASSERT instruction shown in FIG. 4A is structured such that two indices into one or more permission lookup table are provided, and the MODE_ASSERT instruction is therefore configured to cause the data processing apparatus to reference the permission lookup table to determine the relevant runtime processor state configuration values. In the example of FIG. 4A an exception level and security state are required to match for the NOP response to the MODE_ASSERT instruction to be triggered. FIG. 4B schematically illustrates an example data processing apparatus 60, which has a configuration to execute a MODE_ASSERT instruction such as that shown in FIG. 4A. The execution circuitry 62 which executes the instruction uses each index to reference the permission lookup table 64, which returns the relevant processor state check value (the allowed value for the corresponding run time processor state configuration value).

The example MODE_ASSERT instructions shown in FIGS. 3A and 4A define allowed runtime processor state configuration values for more than one type of runtime processor state configuration value (e.g. for both exception level and security state in the example of FIG. 4A). FIG. 4C shows two further example MODE_ASSERT instructions which are each arranged to be runtime processor state configuration specific, in that each only defines allowed runtime processor state configuration values for one type of the value, namely the exception level in the first example of FIG. 4C and the security state in the second example of FIG. 4C. Accordingly, each of the example instructions shown in FIG. 4C will be treated as NOP instructions if at least one of the value flags set in that instruction matches the corresponding runtime processor state configuration value and will generate an illegal instruction exception otherwise.

Figure 5:
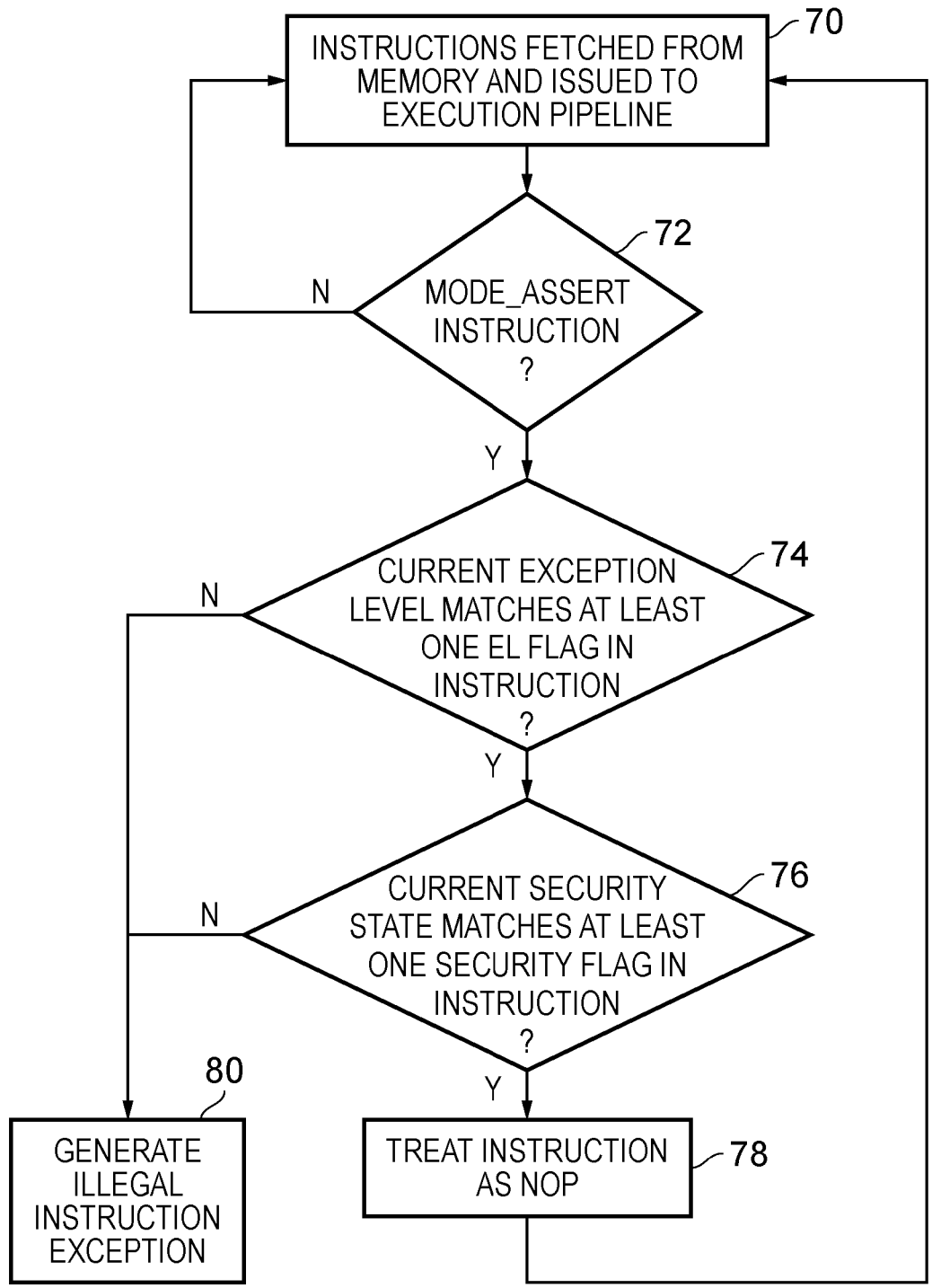
FIG. 5 shows a sequence of steps which are carried out in the method of one embodiment.

FIG. 5 shows a sequence of steps which are taken in the method of one embodiment. The flow can be considered to begin at step 70 at which instructions are fetched from the memory and issued to the execution pipeline. Thereafter, at step 72, each instruction is examined and it is determined if a MODE_ASSERT instruction has been encountered. Whilst this is not true the flow returns to step 70 and the data processing apparatus continues fetching instructions from memory and issuing them to its execution pipeline. When a MODE_ASSERT instruction is encountered the flow proceeds to step 74, where it is determined if the current exception level at which the data processing apparatus (processor) is operating matches at least one exception level (EL) flag in the MODE_ASSERT instruction. If it does, then flow proceeds to step 76, where it is determined if the current security state matches at least one security flag defined in the MODE_ASSERT instruction. If it does, then the flow proceeds to step 78, where this instruction is treated as a NOP instruction and the flow returns to step 70. If however at either step 74 or step 76 a negative outcome to the determination occurs then the flow proceeds to step 80 where an illegal instruction exception is generated. It will be understood therefore that the MODE_ASSERT instruction discussed in the context of this example method is one which defines one or more allowed exception levels and one or more allowed security state but does not for example define a constraint on debug state or privilege level as in the example of the generic MODE_ASSERT instruction shown in FIG. 3A.

Figure 6:
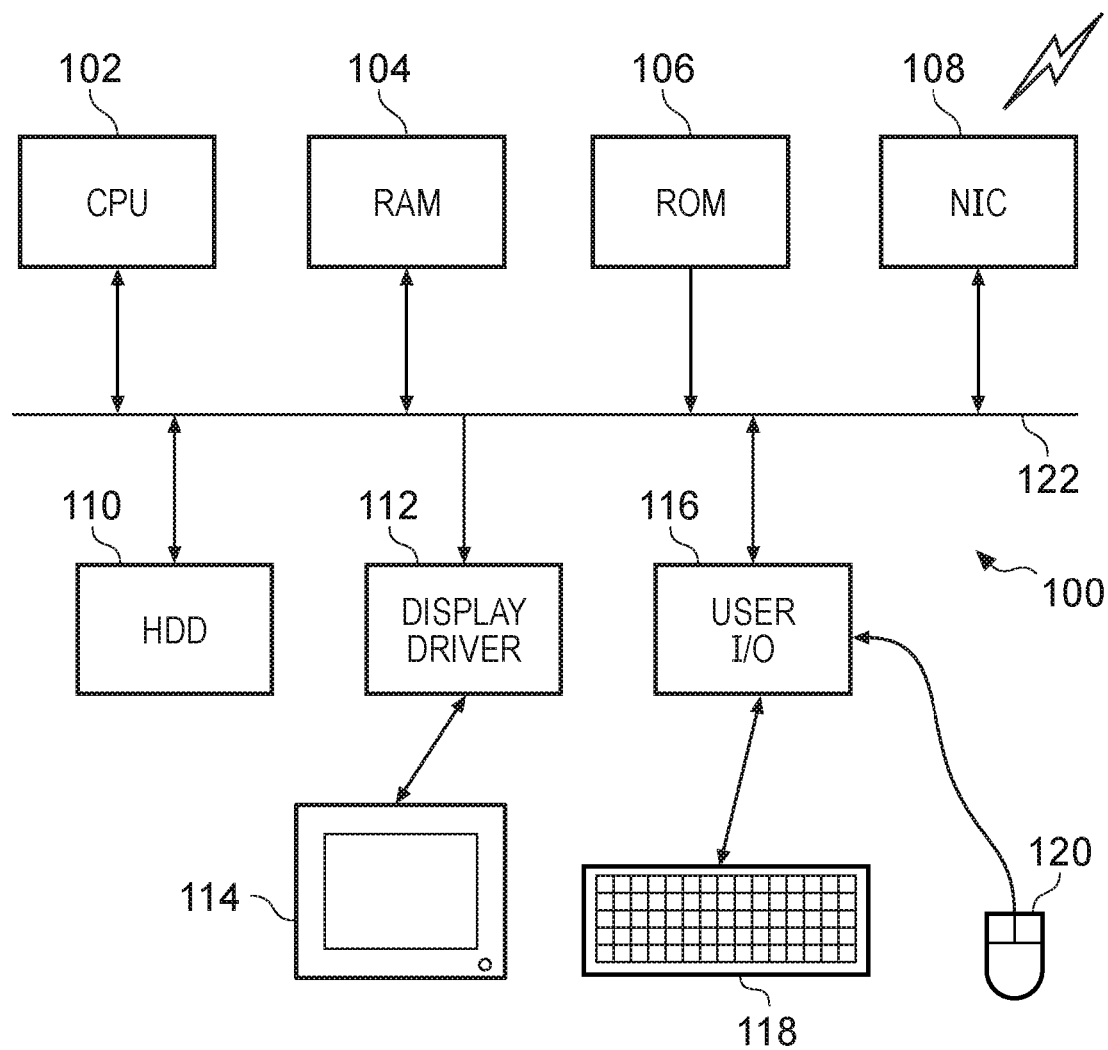
FIG. 6 schematically illustrates a general purpose computing device which is used to provide or support some embodiments.

FIG. 6 schematically illustrates a general purpose computing device 100 of the type that may be used to implement the above described techniques. The general purpose computing device 100 includes a central processing unit 102, a random access memory 104 and a read only memory 106, connected together via bus 122. It also further comprises a network interface card 108, a hard disk drive 110, a display driver 112 and monitor 114, as well as a user input/output circuit 116 with a keyboard 118 and mouse 120 all connected via the common bus 122. In operation the central processing unit 102 will execute computer program instructions that may for example be stored in the random access memory 104 and/or the read only memory 106. Program instructions could be additionally be retrieved from the hard disk drive 110 or dynamically downloaded via the network interface card 108. The results of the processing performed may be displayed to a user via a connected display driver 112 and monitor 114. User inputs for controlling the operation of the general purpose computing device 100 may be received via a connected user input output circuit 116 from the keyboard 118 or the mouse 120. It will be appreciated that the computer program could be written in a variety of different computer languages. The computer program may be stored locally on a recording medium or dynamically downloaded to the general purpose computing device 100. According to the present techniques, the general purpose computing device 100 has a configuration such that it is responsive to one or more type of processor state check instruction as discussed above. The general purpose computing device 100 can also have a configuration which allows it to provide an instruction execution environment (i.e. a virtual machine) such as that discussed above with reference to FIG. 2B. The architecture of the general purpose computing device 100 could vary considerably and FIG. 9 is only one example.

Figure 7:
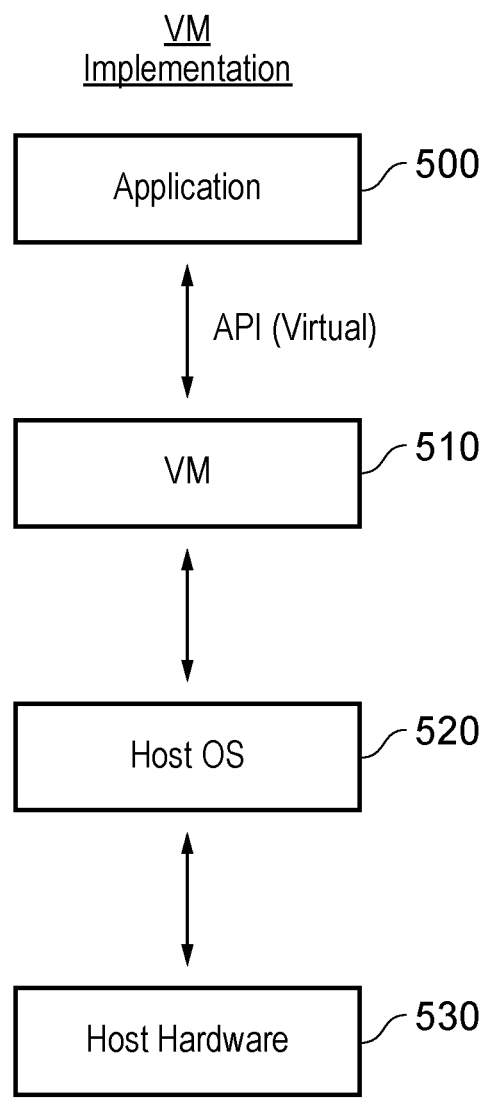
FIG. 7 schematically illustrates a virtual machine environment according to one embodiment.

FIG. 7 illustrates such a virtual machine implementation that may be used. Whilst the above described embodiments generally implement the present techniques in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. This may require a more powerful processor to be provides in order to support a virtual machine implementation which executes at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, program instructions including one or more examples of the above-discussed processor state check instruction may be executed from within the application program 500 using the virtual machine program 510 to model their interaction with the virtual machine hardware.

Some examples of the present techniques are also be described in the following example configurations:

Example 1

A data processing apparatus comprising: data processing circuitry to perform data processing operations in response to data processing instructions, wherein the data processing circuitry is responsive to at least one runtime processor state configuration value stored in the data processing apparatus to perform the data processing operations in a processor state defined by the at least one runtime processor state configuration value, wherein the data processing circuitry is responsive to a processor state check instruction to establish a no-operation condition dependent on the at least one runtime processor state configuration value matching a processor state check value defined by the processor state check instruction, and to treat the processor state check instruction as an ineffective instruction when the no-operation condition is established, and to generate an exception when the no-operation condition is not established.

Example 2

A data processing apparatus comprising: means for performing data processing operations in response to data processing instructions, wherein the data processing operations are performed in a processor state defined by at least one runtime processor state configuration value stored in the data processing apparatus; means for establishing a no-operation condition dependent on the runtime processor state configuration value matching a processor state check value defined by a processor state check instruction; means for treating the processor state check instruction as an ineffective instruction when the no-operation condition is established; and means for generating an exception when the no-operation condition is not established.

Example 3

A method of data processing comprising: performing data processing operations in response to data processing instructions, wherein the data processing operations are performed in a processor state defined by at least one runtime processor state configuration value; in response to a processor state check instruction, establishing a no-operation condition dependent on the at least one runtime processor state configuration value matching a processor state check value defined by the processor state check instruction; treating the processor state check instruction as an ineffective instruction when the no-operation condition is established; and generating an exception when the no-operation condition is not established.

In the present application, the words "configured to . . . " or "arranged to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to . . . " does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
data processing circuitry to perform data processing operations in response to a sequence of data processing instructions, wherein the data processing circuitry is responsive to at least one runtime processor state configuration value stored in the data processing apparatus to perform the data processing operations in a processor state defined by the at least one runtime processor state configuration value,
wherein the data processing circuitry is responsive to a processor state check instruction in the sequence of data processing instructions, the processor state check instruction specifying a processor state check value, to perform a check to determine whether the processor state defined by the at least one runtime processor state configuration value is an allowed processor state for executing the sequence of instructions,
wherein the check comprises:
establishing a no-operation condition dependent on the processor state defined by the at least one runtime processor state configuration value matching the processor state check value defined by the processor state check instruction,
treating the processor state check instruction as an ineffective instruction when the no-operation condition is established, and
generating an illegal instruction exception when the no-operation condition is not established, wherein in response to said illegal instruction exception further execution of said sequence of data processing instructions is prevented,
wherein the processor state defined by the at least one runtime processor state configuration value comprises at least one of:
operation at an exception level of multiple exception levels at which the data processing apparatus is capable of performing the data processing operations,
a security state of multiple security states in which the data processing apparatus is capable of performing the data processing operations, and
a privilege mode of multiple privilege modes in which the data processing apparatus is capable of performing the data processing operations.

2. The data processing apparatus as claimed in claim 1, wherein the processor state defined by the at least one runtime processor state configuration value comprises a debug state of multiple debug states in which the data processing apparatus is capable of performing the data processing operations.

3. The data processing apparatus as claimed in claim 1, wherein the data processing circuitry is responsive to multiple runtime processor state configuration values stored in the data processing apparatus to perform the data processing operations in respective processor states defined by the multiple runtime processor state configuration values,
and wherein the data processing circuitry is responsive to the processor state check instruction to require each of the multiple runtime processor state configuration values to match a corresponding processor state check value of multiple processor state check values defined by the processor state check instruction to establish the no-operation condition.

4. The data processing apparatus as claimed in claim 1, wherein the data processing circuitry is responsive to multiple runtime processor state configuration values stored in the data processing apparatus to perform the data processing operations in respective processor states defined by the multiple runtime processor state configuration values,
and wherein the data processing circuitry is responsive to each of multiple types of processor state check instruction to require a corresponding runtime processor state configuration value of the multiple runtime processor state configuration values to match a corresponding processor state check value defined by that processor state check instruction to establish the no-operation condition.

5. The data processing apparatus as claimed in claim 1, wherein the processor state check instruction defines multiple processor state check values for one type of processor state,
and wherein the data processing circuitry is responsive to the processor state check instruction to require at least one of the multiple processor state check values defined for one type of processor state to match the runtime processor state configuration value stored in the data processing apparatus for the one type of processor state to establish the no-operation condition.

6. The data processing apparatus as claimed in claim 1, wherein the data processing apparatus comprises a state register to store the runtime processor state configuration value.

7. The data processing apparatus as claimed in claim 1, wherein treating the processor state check instruction as an ineffective instruction comprises allowing the processor state check instruction to proceed through an execution pipeline of the data processing circuitry without affecting an outcome of the data processing operations.

8. The data processing apparatus as claimed in claim 1, wherein treating the processor state check instruction as an ineffective instruction comprises treating the processor state check instruction as a no-operation instruction.

9. A dynamic code generator capable of generating data processing instructions for a data processing apparatus as claimed in claim 1, wherein the data processing instructions comprise the processor state check instruction.

10. A virtual machine provided by a computer program executing upon a data processing apparatus, said virtual machine providing an instruction execution environment corresponding to the apparatus of claim 1.

11. A data processing apparatus comprising:
means for performing data processing operations in response to a sequence of data processing instructions, wherein the data processing operations are performed in a processor state defined by at least one runtime processor state configuration value stored in the data processing apparatus;
means for performing, in response to a processor state check instruction in the sequence of processing instructions, a check to determine whether the processor state defined by the at least one runtime processor state configuration value is an allowed processor state for executing the sequence of instructions;
wherein the processor state check instruction specifies a processor state check value, and the check comprises:
establishing a no-operation condition dependent on the processor state defined_by the runtime processor state configuration value matching the processor state check value defined by a processor state check instruction;
treating the processor state check instruction as an ineffective instruction when the no-operation condition is established; and
generating an illegal instruction exception when the no-operation condition is not established, wherein in response to said illegal instruction exception further execution of said sequence of data processing instructions is prevented,
wherein the processor state defined by the at least one runtime processor state configuration value comprises at least one of:
operation at an exception level of multiple exception levels at which the means for performing data processing operations is capable of performing the data processing operations,
a security state of multiple security states in which the means for performing data processing operations is capable of performing the data processing operations, and
a privilege mode of multiple privilege modes in which the means for performing data processing operations is capable of performing the data processing operations.

12. A method of data processing comprising:
performing data processing operations in response to a sequence of data processing instructions, wherein the data processing operations are performed in a processor state defined by at least one runtime processor state configuration value;
in response to a processor state check instruction in the sequence of data processing instructions, the processor state check instruction specifying a processor state check value, to perform a check to determine whether the processor state defined by the at least one runtime configuration value is an allowed processor state for executing the sequence of instructions,
wherein the check comprises:
establishing a no-operation condition dependent on the processor state defined by on the at least one runtime processor state configuration value matching the processor state check value defined by the processor state check instruction;
treating the processor state check instruction as an ineffective instruction when the no-operation condition is established; and
generating an illegal instruction exception when the no-operation condition is not established, wherein in response to said illegal instruction exception further execution of said sequence of data processing instructions is prevented,
wherein the processor state defined by the at least one runtime processor state configuration value comprises at least one of:
operation at an exception level of multiple exception levels at which the data processing operations are capable of being performed,
a security state of multiple security states in which the data processing operations are capable of being performed, and
a privilege mode of multiple privilege modes in which the data processing operations are capable of being performed.

13. A non-transitory computer readable storage medium having computer program instructions stored thereon, which when executed on a computing device, causes the computing device to carry out the method of claim 12.

* * * * *